Sept. 29, 1925.

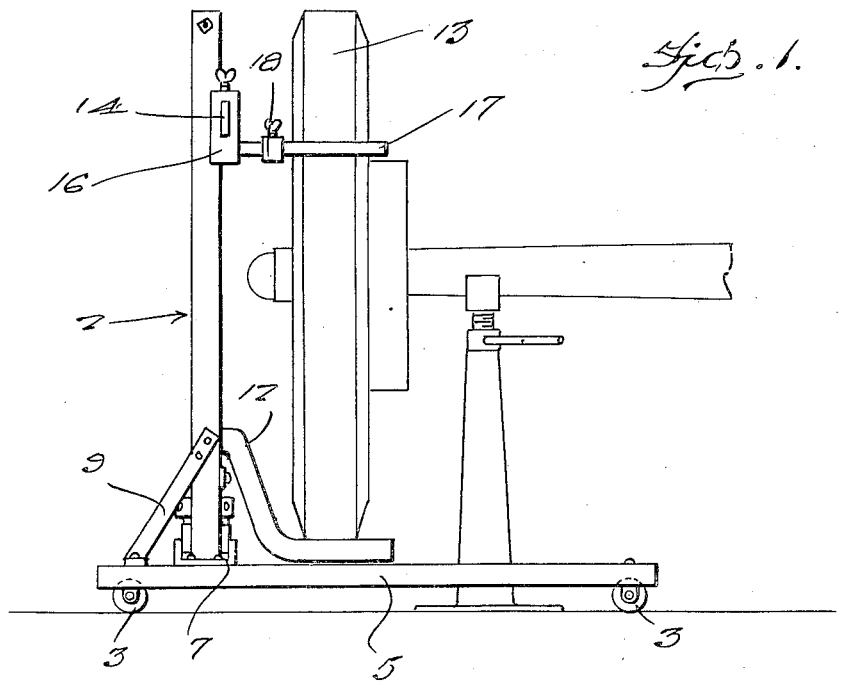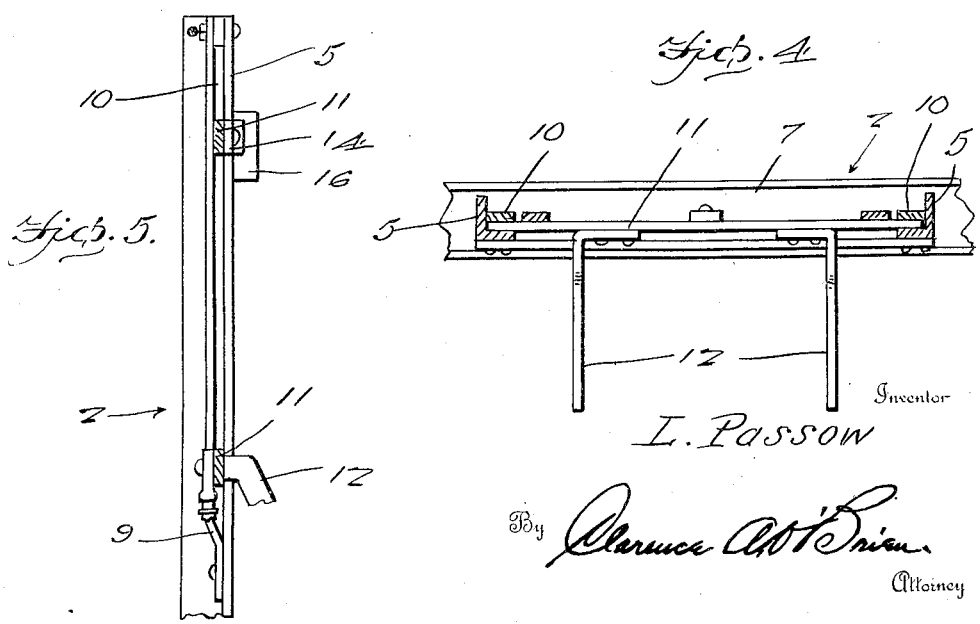

L. PASSOW

WHEEL JACK

Filed June 27, 1925

Inventor
L. Passow
By Clarence A. O'Brien
Attorney

Patented Sept. 29, 1925.

1,555,152

UNITED STATES PATENT OFFICE.

LOUIS PASSOW, OF SAGINAW, MICHIGAN.

WHEEL JACK.

Application filed June 27, 1925. Serial No. 39,977.

*To all whom it may concern:*

Be it known that I, LOUIS PASSOW, a citizen of the United States, residing at Saginaw, in the county of Saginaw and State of Michigan, have invented certain new and useful Improvements in a Wheel Jack, of which the following is a specification.

This invention relates to an improved jack which is especially, but not necessarily designed for use in public garages and the like, and its purpose is to enable a single mechanic to remove a comparatively heavy wheel and tire by himself, a job ordinarily requiring the service of two or more mechanics.

The invention has more specific reference to a portable structure embodying a frame adapted to be raised and lowered, this frame being equipped with retaining means whereby the wheel and tire, as a unit, are held thereon.

The specific details and their relative arrangement and association will become apparent from the following description and drawing.

In the accompanying drawing forming a part of this application and in which like numerals are employed to designate like parts throughout the same:

Figure 1 is a side elevational view of a jack constructed in accordance with the present invention.

Figure 4 is a horizontal sectional view through the upright.

Figure 5 is a fragmentary sectional and elevational view taken vertically through a portion of said upright.

Figure 2:
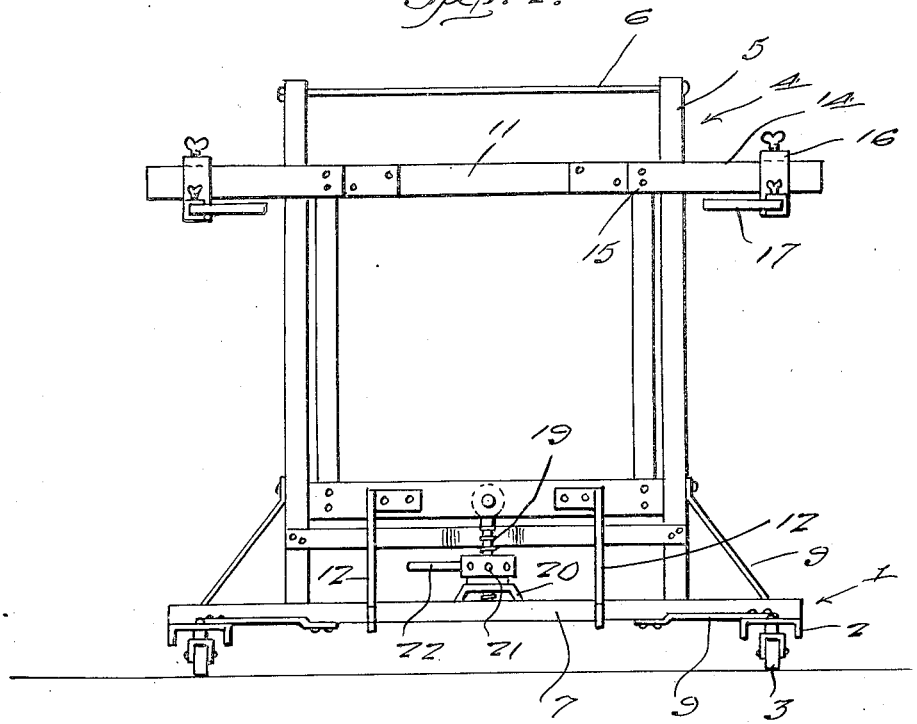
Figure 2 is a front or inside view with the wheel removed.
Figure 3:
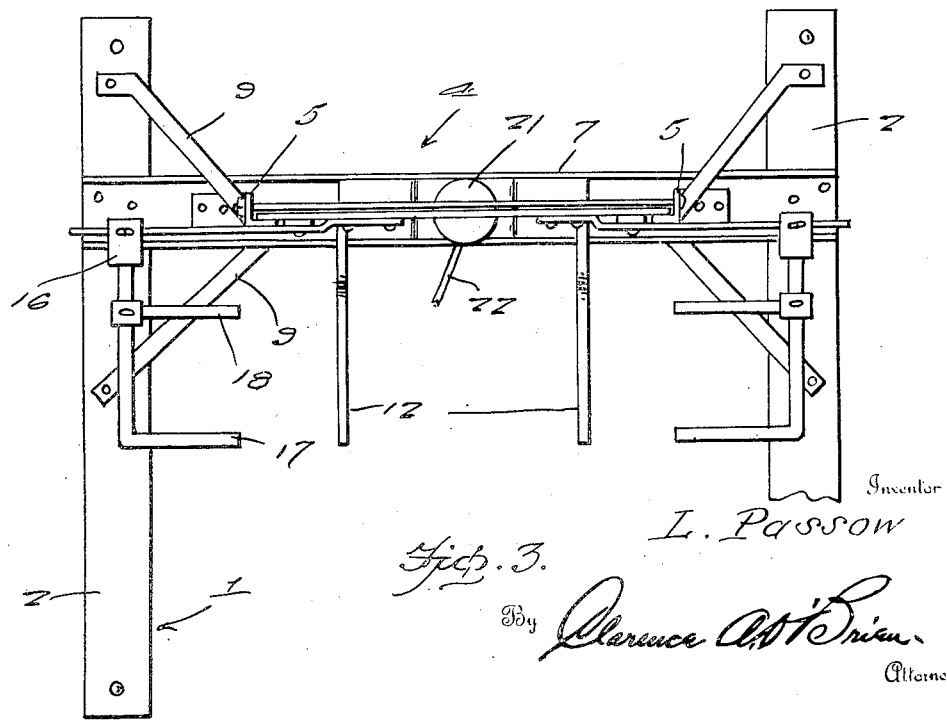
Figure 3 is a top plan view of Figure 2.

Referring to the drawing in detail, the reference character 1 designates what may be generally referred to as a base. The base is preferably composed of a pair of spaced parallel channel bars provided with a plurality of appropriate casters 3, thus forming what may be said to be a truck.

Supported from this truck or base is an upright 4. This upright comprises spaced vertical standards 5 connected together at their tops by a cross bar or rod 6, and secured at their bottoms to a horizontal channel bar 7. This channel bar is secured to the aforesaid channel bars 2. Suitable braces 9 are employed and arranged at the most desirable point for securing rigidity of structure. At this time attention is directed to the fact that the standards 5 are composed of agle bars and strips 10. By referring to Figure 4 it will be seen that the strips are disposed in spaced parallelism with one flange to provide guideways for a substantially rectangular frame 11. This frame is made up of horizontal and vertical members, the ends of the horizontal ones of which are slidable in the guideways. Attached to the lower horizontal bar of the frame is a pair of right angle brackets serving as wheel rests for the wheel 13 shown in Figure 1. These brackets are preferably of the angular formation shown more plainly in Figure 1. Cooperative with the brackets are arms 14 fastened at their inner ends to the frame and offset as shown at 15. Blocks 16 are slidably and adjustably mounted upon the arms 14 and carry wheel confining members 17 of right angular formation, and fingers 18 are adjustable upon these members to accommodate different widths of wheels.

For the purpose of raising the frame and wheel retaining means together I provide a depending screw 19 fastened to the center of the horizontal lower bar of said frame, and this extends downwardly through an inverted U-shaped member 20, upon which a feed nut 21 rests. By preference the nut is equipped with a handle 22, or with spanner wrench sockets.

From the foregoing description it is obvious that after the wheel and axle or the complete chassis of the vehicle is jacked up in the usual way, the supplemental and improved jack devised by me is moved in place as indicated in Figure 1. The angular brackets 12 are brought up against the bottom or periphery of the tire of the wheel, and the confining members 17 and 18 are adjusted to hold the wheel in place. It will be noted that sufficient room is provided between the parts to facilitate work by the mechanic on the wheel. Moreover, it is understood that the adjustment of the frame is accomplished through the medium of the nut and bolt or screw. If it is desired to move a comparatively heavy truck wheel from place to place in the garage, after taking it off, it is obvious that this may be easily done with the improved jack structure.

No doubt, a careful consideration of the description in connection with the drawings will enable persons skilled in the art to which the invention relates to obtain a clear understanding of the same. Therefore, a more lengthy description is thought unnecessary.

While the preferred embodiment of the invention has been shown and described, it is to be understood that minor changes coming within the field of invention claimed may be resorted to if desired.

Having thus described the invention, what I claim as new and desire to secure by Letters Patent is:—

1. In a jack of the class described, a wheel supported base, an upright rising from said base, said upright comprising spaced vertical standards, a frame vertically adjustable upon said standards, hoisting and lowering means for said frame, a pair of angular brackets mounted on said frame and serving as wheel rests, and horizontally adjustable wheel engaging devices also mounted on said frame and cooperable with the upper portion of the wheel for holding it in position on said rests.

2. A wheel jack of the class described comprising a base, said base including spaced parallel angle bars, casters connected to said angle bars, standards rising from said base, a frame vertically adjustable upon said standards, hoisting and lowering means interposed between the frame and base, angular brackets carried by said frame, horizontal arms carried by said frame, and wheel clamps horizontally adjustable on said arms.

In testimony whereof I affix my signature.

LOUIS PASSOW.